(12) United States Patent
Hamann et al.

(10) Patent No.: US 12,030,510 B2
(45) Date of Patent: Jul. 9, 2024

(54) METHOD FOR OPERATING A PROCESSING UNIT

(71) Applicant: Robert Bosch GmbH, Stuttgart (DE)

(72) Inventors: Arne Hamann, Ludwigsburg (DE); Dakshina Narahari Dasari, Boeblingen (DE); Falk Rehm, Renningen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 287 days.

(21) Appl. No.: 17/695,235

(22) Filed: Mar. 15, 2022

(65) Prior Publication Data

US 2022/0306135 A1 Sep. 29, 2022

(30) Foreign Application Priority Data

Mar. 26, 2021 (DE) ...................... 10 2021 203 061.0

(51) Int. Cl.
*B60W 50/06* (2006.01)
*G06F 9/50* (2006.01)

(52) U.S. Cl.
CPC ........... *B60W 50/06* (2013.01); *G06F 9/5027* (2013.01)

(58) Field of Classification Search
CPC ............................ B60W 50/06; G06F 9/5027
See application file for complete search history.

(56) References Cited

U.S. PATENT DOCUMENTS

| 8,275,827 | B2* | 9/2012 | Hubbard | ............ G06Q 30/0212 709/203 |
| 2008/0270731 | A1* | 10/2008 | Bryant | .................. G06F 9/5016 711/170 |
| 2018/0181438 | A1* | 6/2018 | Wang | .................... G06F 9/5083 |
| 2020/0293382 | A1* | 9/2020 | Ivancich | ................. G06F 9/526 |

OTHER PUBLICATIONS

Marco Caccamo, Rodolfo Pellizzoni, Lui Sha, Gang Yao, and Heechul Yun, 2013, "MemGuard: Memory bandwidth reservation system for efficient performance isolation in multi-core platforms," in Proceedings of the 2013 IEEE 19th Real-Time and Embedded Technology and Applications Symposium (RTAS) (RTAS '13); IEEE Computer Society, Washington, DC, USA, 11 pages.

* cited by examiner

*Primary Examiner* — Gertrude Arthur Jeanglaude
(74) *Attorney, Agent, or Firm* — NORTON ROSE FULBRIGHT US LLP; Gerard A. Messina (57) ABSTRACT

A method for operating a processing unit, in which a multiplicity of processes are carried out, which together access a resource according to a predefined resource distribution. The method includes a determination of an instantaneous actual processing time of at least one of the multiplicity of processes during an execution of the at least one of the multiplicity of processes, within which the at least one of the multiplicity of processes is processed; a comparison of the actual processing time with a setpoint processing time assigned to the at least one of the multiplicity of processes and/or with a sum of the assigned setpoint processing time and a processing time extension assigned to the at least one of the multiplicity of processes; and an adaptation of the predefined resource distribution as a function of a result of this comparison.

16 Claims, 2 Drawing Sheets

METHOD FOR OPERATING A PROCESSING UNIT

FIELD

The present invention relates to a method for operating a processing unit as well as a processing unit and a computer program for carrying out the method.

BACKGROUND INFORMATION

Applications or processes in vehicle which relate, for example, to autonomous or automated driving, may be highly computation- and data-intensive. Correspondingly, there is a trend toward using high-performance computer platforms in cyber-physical systems (e.g., by transferring them to computing systems outside the vehicle (so-called cloud). Platforms of this type may be used to carry out different processes having different quality requirements with respect to quality or quality of service (QoS), for example having individual requirements with regard to latency period, throughput or so-called best effort. Quality of service is a measure of how much the quality of a service meets the requirements.

Different units, such as CPU clusters, GPUs or other user-defined hardware accelerators (also referred to as memory masters or masters) typically exist on platforms of this type, all of which may access a shared resource via a connection, e.g., a shared memory (slave). An application, which is executed on a certain core (which is understood to be, in particular, one of multiple processor cores of the CPU or of the CPU cluster), initially competes for the memory with applications on other cores. In addition, other masters, such as the GPU, may compete with the CPU for the shared memory via the shared connection.

It has been shown that a process may suffer a considerable lengthening of the execution time, due to the access to shared resources, such as the main memory, if this process is carried out together with other processes on a shared multi-core platform. This competition with other masters further intensifies the problem. It is therefore important to facilitate a failure-free operation and temporal decoupling during the joint execution of different processes on multi-core platforms, in particular for processes having real-time requirements.

SUMMARY

According to the present invention, a method is provided for operating a processing unit as well as a processing unit and a computer program for carrying out the method. Advantageous embodiments of the present invention are disclosed herein.

A multiplicity of processes or applications are carried out in the processing unit, which together access a resource according to a predefined resource distribution. An example embodiment of the present invention makes use of the measure of assigning to individual processes a runtime or processing time to be maintained as well as assigning a permissible runtime extension as a tolerance. When these specifications may not be adhered to, for example because conflicts occur during the accesses to the shared resource, the distribution of the resource to the individual processes is adapted.

In particular, the processing unit includes a processor unit including a multiplicity of processor cores, which carry out the multiplicity of processes and which together are connected to the corresponding resource, e.g., via a data connection such as a bus. A processor unit of this type may be designed, for example, as a CPU (central processing unit), a GPU (graphics processing unit) or, for example, also as a DMA or DMA controller (direct memory access) or as a dedicated accelerator.

This shared resource may particularly advantageously be a memory unit, for example a shared random-access memory, i.e., in particular a volatile memory, such as a DRAM (dynamic random access memory). A memory unit of this type includes a bandwidth or memory bandwidth, i.e., a rate of data which may be read and/or written per time unit. This bandwidth is not necessarily constant. A DRAM, for example, has its own internal optimization mechanisms (cf. e.g., caches), so that this bandwidth may be higher or lower, depending on the sequence of access to memory addresses and a locality of the data. The processor cores, and thus the executed processes, must share the available bandwidth independently thereof.

The shared resource used may furthermore also be, for example, a computing capacity of the processing unit or the processor unit, for example if individual processes are not permanently assigned to a particular processor core, but may be executed by multiple cores. For example, the shared resource used may also be a module in the processing unit or another unit, e.g., a peripheral device.

According to the predefined resource distribution, the accesses of the individual processor cores and thus of the individual processes are advantageously regulated to the shared resource. Due to this resource distribution, in the case of a shared memory unit, the available memory bandwidth is particularly advantageously divided among the individual processor cores and processes. Due to the present method, a possibility is provided for dynamically adapting the resource distribution to the shared resource used during the operation of the processing unit for the purpose of meeting the requirements of the individual processes.

For this purpose, within the scope of the present method, individual or, in particular, all processes are each assigned or predefined a setpoint processing time or a setpoint execution time and a permissible processing time extension. The particular process is to be, in particular, completely processed or executed within the particular assigned setpoint processing time. An actual processing time of the particular process should deviate from the particular assigned setpoint processing time by no more than the particular assigned processing time extension. A deviation of the actual processing time from the setpoint processing time takes place, in particular, if multiple processes access the same resource in parallel. If the actual processing time exceeds the setpoint processing time by more than the particular (permissible) processing time extension, a functionality of the particular process or even the entire processing unit may be impaired.

In accordance with an example embodiment of the present invention, the setpoint processing time advantageously represents a guide value or reference value for the runtime of the particular process and may correspond, for example, to a runtime to be expected if the particular process is executed in an isolated manner or independently of other processes competing for the resource and may thus access the corresponding resource exclusively. A sum of the setpoint processing time and the processing time extension may be particularly advantageously predefined as a permissible threshold value or a permissible limiting value for the actual processing time. In particular, the processing time extension may correspond to a permissible percentage or an absolute time, by which the setpoint processing time may be maximally extended if corresponding delay effects occur due to the shared access to the resource.

The setpoint execution time or processing time may be viewed and indicated globally for the entire process or on the interval level. The setpoint processing times as well as the processing time extensions may each be indicated, for example, as absolute time values or advantageously also as relative values, from which absolute time values may be derived. For example, the setpoint processing times and the processing time extensions may each be predefined as counter values of a (hardware) performance monitoring counter (PMC) or performance monitoring unit (PMU), which measures or counts certain operations or activities in the processing unit. The working time change may furthermore be predefined, for example, as a percentage deviation from these counter values. Based on counter values of this type, the corresponding runtimes or the corresponding setpoint processing times and processing time extensions advantageously result automatically, due to the target hardware platform.

In accordance with an example embodiment of the present invention, during the execution of the individual processes in the processing unit, instantaneous actual processing times of the individual processes are determined or ascertained, in which the individual processes are effectively instantaneously processed. These actual processing times of the individual processes are compared with the particular assigned setpoint processing times and/or with a sum of the particular assigned setpoint processing times and the particular assigned processing time extension. The resource distribution is adapted as a function of a result of this comparison. In particular, it is thus monitored whether, and if yes, the degree to which the effective actual processing times of the individual processes deviate from the predefined setpoint values during regular operation of the processing unit. If individual actual times deviate from the particular setpoint processing times, this indicates, in particular, that conflicts of individual processes occur during the access to the shared resource, by which the processing times of processes are delayed. If individual actual processing times deviate from the assigned setpoint processing times by even more than the particular permissible processing time extension, the system moves beyond what is permissible, and corresponding processes may be negatively affected, for example, due to access conflicts, and instabilities of the system may occur.

Depending on whether and the extent to which associated actual and setpoint processing times deviate from each other, the resource distribution is advantageously adapted in such a way that these deviations are reduced, and the processing times of the corresponding processes approach their particular setpoint values. In particular, the resource distribution is adapted in such a way that critical processes which exceed their particular setpoint processing time are granted more access to the resource, so that these processes are not negatively affected during the execution. Non-critical processes whose actual and setpoint processing times match or at least essentially match may be granted less access to the resource during the course thereof. For example, a runtime priority value may be assigned to each process for this purpose, which marks the importance of the process meeting the runtime requirement.

The present method thus makes it possible to dynamically and individually regulate, during the operation of the processing unit, which processes may access the shared resource used and to what extent, so that access conflicts, delays and even errors or instabilities do not occur during the execution of the processes. The distribution of the resources to the different processes is thus independently and automatically regulated by the processing unit and individually adapted to the instantaneously executed applications and processes.

In accordance with an example embodiment of the present invention, the monitoring of the processing times and the adaptation of the resource distribution are advantageously carried out in software by a corresponding software unit or by a corresponding software module or a software mechanism. For example, this software mechanism may be provided as an execution or resource manager. This software mechanism or execution manager may be carried out, in particular, by the processor unit of the processing unit.

It is also possible to implement a separate hardware unit in the processing unit, which carries out this software mechanism.

The method of the present invention further makes it possible to separate the determination of the best possible resource distribution on the hardware and software sides. In particular, the setpoint processing time and the processing time extension may be predefined for a particular process by a programmer or software developer, for example during the course of a manufacturing or programming phase of the particular process. In particular, the setpoint processing time and the processing time extension may be predefined for the particular process independently of the special processing unit or hardware configuration, on which the process will be carried out later on. The developers of the individual software processes may thus be granted a high degree of freedom and flexibility for development. These specifications of the software developer as to how their particular process is to be best carried out are automatically taken into account by the processing unit during its operation. For example, the setpoint processing times may be indicated for this purpose by relative values, e.g., in the form of counter values etc., and the processing time extensions may each be indicated, for example, as increases of these counter values.

The individual processes or applications carried out in the processing unit may have, in particular, different quality requirements with respect to quality or quality of service. QoS or quality of service is a measure of how much the quality of a service meets the requirements. Depending on the type and priority of the particular application, the individual processes may respond differently to delays in their processing. In particular, each process may tolerate a certain degree of performance deterioration, depending on its time criticality, in the form of an extension of the execution time, due to conflicts on the shared hardware resource used, if it is carried out at the same time as other applications. Delays may thus have a more or less critical effect on the individual processes and the entire system. For example, no or few negative effects in terms of processing delays may result for non-time-critical, less relevant processes, such as the creation of log files or protocol files. However, time-critical processes, or those to be carried out in real time, for example during the course of controlling electric machines, internal combustion engines, inverters, etc., have, in particular, only limited leeway with respect to their processing times and may tolerate only limited delays in their processing. The setpoint processing times and the permissible processing time extensions are advantageously predefined individually for each process, based on the criticality and sensitivity thereof, in particular based on the maximum increase of the execution time which the particular process may tolerate to function correctly. Based on these specifications, the resource distribution in the system is monitored online and controlled dynamically, so that the effects of access conflicts, in particular in the form of extensions of the execution times, are limited to the particular predefined, permissible value for each process. Due to the present method, the quality of service may thus be particularly advantageously ensured for the different processes and applications.

Shared used resources are often statically provided or distributed in the conventional way and usually configured taking into account so-called worst-case competition scenarios. A static resource distribution of this type may result in an inefficient use of the system resources. For example, a mechanism or a method is described in Marco Caccamo, Rodolfo Pellizzoni, Lui Sha, Gang Yao, and Heechul Yun, 2013, "MemGuard: Memory bandwidth reservation system for efficient performance isolation in multi-core platforms," in Proceedings of the 2013 IEEE 19th Real-Time and Embedded Technology and Applications Symposium (RTAS) (RTAS'13); IEEE Computer Society, Washington, DC, USA, 55-64, in which a minimum memory bandwidth is guaranteed for different CPU cores within a CPU cluster. This works in that a core is assigned a budget, i.e., a certain value or share is assigned for using the total available memory bandwidth, and in that cache errors of the last level are monitored at a regulating interval, and the core is then stopped if the budget is exceeded within a regulating interval. This method also offers a possibility for dynamically assigning the memory bandwidth based on the previous usage profile. However, the prediction always observes the preceding intervals and is not event-controlled. A static assignment of budgets to each core is assumed, and the unused budget is then redistributed.

Another conventional possibility of memory-conscious planning is to establish beforehand, e.g., using a planner, the tasks which are to be carried out together at a certain point in time on different cores, so that the memory limits may not be extended. The application may also be organized in memory and computing phases, and the different memory phases of applications may be planned on different cores. However, an approach is desirable, which is independent of the planning logic and does not change the application behavior.

On the hardware side, embedded high-performance platforms conventionally increasingly offer, e.g., QoS modules for the connection between the masters (e.g., CPU, GPU, DMA) and the main memory. These QoS modules help regulate the data traffic based on different parameters, such as outstanding transactions, rate regulation or latency-based regulation. For example, the registers on the connection may be configured in such a way that a limit is established for the outstanding transactions, for example for the GPU, so that the connection is not flooded with memory transactions. The connection then throttles the incoming data traffic from the GPU as soon as the limit is exceeded, so that other masters may access the memory. Modules of this type are typically programmable via registers and control the main components connected to the connection.

However, a QoS module of this type usually conventionally treats the entire cluster of cores as a single master, since the entire cluster is connected to a single port or a single interface with the connection. The QoS thus may offer only a regulation on the level of the cluster and may possibly not differentiate between different cores, which does not solve the problem of a cross-core competition. A static configuration of the regulation parameters may furthermore not be sufficient to use the shared memory efficiently.

In addition, the QoS regulation of different cores within one CPU cluster is conventionally not supported by the underlying hardware. This means that the hardware QoS support on the interconnect level is able to protect the cores only against other disturbance sources but not against the other cores within the same cluster. Software mechanisms therefore conventionally often provide interference regulation necessary on top in combination with the QoS support on the interconnect level.

In software-based regulation mechanisms of this type, however, only a static resource budget is often assigned for each core. A resource budget is often set to the highest number of resource accesses within a certain control interval, which may result in an enormous slowing of non-real-time cores. It may also prove to be difficult to configure mechanisms of this type. They require expert knowledge of the underlying hardware and specific workloads. In the case of large software stacks, for example, which are made up of a hypervisor, operating system, middleware and additional virtualization, such as Docker containers, this may prove to be very complex. Incorrectly configured systems may result in enormous performance sacrifices or fail to reduce disturbing effects.

In contrast to methods of this type, a software mechanism is provided by the present method, which automatically takes into account the changing resource use patterns of processes, e.g., changing memory use patterns, and may reconfigure these regulating parameters in the QoS modules. In accordance with an example embodiment of the present invention, the method provides a possibility to continue dynamically regulating resources on the connection level, such as memory bandwidth for different masters—which may be both individual processor units and groups thereof (or cores)—and to additionally regulate the resources between the cores within a group of processor units, i.e., within a master.

The determination of the instantaneous actual processing times, the comparison of the determined actual processing times with the particular assigned setpoint processing times or with the sum of the particular assigned setpoint processing times and the particular assigned processing time extension and the adaptation of the resource distribution are advantageously carried out cyclically at predefined monitoring intervals. The deviation of the instantaneous actual processing times from the particular setpoint values may be determined in an instantaneous monitoring event, and the resource distribution may be adapted based on the deviation. The effect of this adaptation on the processing times may be observed in a subsequent monitoring event.

The resource distribution is preferably adapted as a function of whether the actual processing time of at least one process deviates from the particular assigned setpoint processing time by more than the particular assigned processing time extension. The resource distribution is advantageously dynamically adapted in such a way that preferably none of the permissible processing time extensions are exceeded and in such a way that instabilities of the system do not occur.

Alternatively or additionally, the resource distribution is preferably adapted as a function of how much the actual processing times of the individual processes deviate from the particular setpoint processing times. In particular, the resource distribution is dynamically regulated in this case, so that an optimal distribution of the resource may be found, and a best possible processing time as close as possible to the predefined setpoint value is achieved in each case.

The instantaneous actual processing times of the individual processes are advantageously determined with the aid of at least one performance monitoring counter. (Hardware) performance monitoring counters (PMCs) or performance monitoring units (PMUs) are components of processor units or microprocessors, for example in the form of special registers which measure or count certain operations or activities in the processing unit. Data of corresponding performance monitoring counters are thus advantageously collected to monitor increases in the execution times of the processes, which the processes undergo during their execution. In particular, data from a combination of multiple performance monitoring counters may be taken into account. In particular, the monitoring by the performance monitoring counters may be carried out cyclically at the predefined monitoring intervals. The software mechanism or execution manager may advantageously read in pieces of information from these performance monitoring counters and compare them with the stored predefined setpoint processing times and processing time extensions.

According to one preferred specific embodiment of the present invention, during the course of the resource distribution, accesses of the multiplicity of processes to the shared resource used are regulated or organized or classified based on different distribution parameters. In particular, different distribution mechanisms or control or organization mechanisms may be provided, which assign parts of the resource to individual processor cores or processes in different ways according to these distribution parameters. For this purpose, a multiplicity of QoS modules or QoS mechanisms are particularly advantageously provided for this purpose, which regulate a particular distribution mechanism based on a particular distribution parameter.

One or multiple of the distribution parameters is/are preferably adapted as a function of the result of the comparison of the actual processing times with the setpoint processing times or with the sum of the particular setpoint processing times and the processing time extensions. The different distribution parameters offer flexible possibilities for adapting the distribution of the resource. In particular, setpoint values for the distribution parameters may be determined as a function of the specifications to the individual processes, i.e., as a function of the setpoint processing times and the processing time extensions. The setpoint processing times and processing time extensions are thus advantageously translated into QoS-specific setpoint values or tuning parameters for different hardware and software QoS mechanisms. In particular, the software mechanisms or execution managers may adapt the particular distribution parameters for determining and comparing the actual processing times based on the instantaneous comparison result of the individual QoS modules or QoS mechanisms. The software mechanism advantageously communicates the QoS-specific setpoint values to the individual QoS modules or QoS mechanisms, which coordinate the particular distribution parameters.

According to one advantageous specific embodiment of the present invention, relationships or connections or correlations between the adaptation of individual distribution parameters and the change in the actual processing times of individual processes resulting therefrom are determined or learned. These determined or learned relationships are used to adapt one or multiple of the distribution parameters as a function of the result of the comparison of the actual processing times with the setpoint processing times or with the sum of the particular setpoint processing times and the processing time extensions. In particular, the software mechanism may learn corresponding correlations between distribution parameters and processing times during the course of machine learning or with the aid of an algorithm for machine learning. In particular, these relationships may be determined at a first point in time, e.g., during the course of a learning phase, and be used at a later second point in time, in particular during the course of a regular operation of the processing unit.

The resource distribution is advantageously adapted in that a part of the resource, which is assigned to a first process, is partially or completely assigned to a second process. The resource may thus be partially redistributed, for example from a first process whose actual and setpoint processing times are close together or which, for example, is not a time-critical process, to a second process whose processing is not to be delayed.

Alternatively or additionally, the resource distribution may be adapted in that a number of transactions or operations to be carried out is preferably reduced for a predefined time interval, in particular for a next monitoring interval. For example, non-time-critical transactions may be postponed to grant time-critical processes access to the resource.

The resource distribution may furthermore be alternatively or additionally adapted in that an execution priority of a certain process is preferably increased, in particular a process whose actual processing time deviates from the particular assigned setpoint processing time by more than the particular assigned processing time extension. This higher-priority process is advantageously granted faster access to the resource than processes having a lower execution priority.

Alternatively or additionally, the resource distribution may preferably be adapted in that the resource, or at least a part of the resource, is exclusively assigned to a certain process. For example, a time-critical process, which is delayed due to access conflicts, is thus granted exclusive access to the resource or to part thereof.

Alternatively or additionally, the resource distribution is advantageously adapted in that the resource is partitioned, and one of these partitions is exclusively assigned to a particular process. For example, during the course thereof, a shared memory used may be divided into a multiplicity of individual memory areas, which may be flexibly assigned to individual processes.

If the actual processing times of multiple processes each deviate by more than the particular assigned processing time extension of the particular assigned setpoint processing time, the risk exists that problems or instabilities may occur, due to access conflicts among all these processes. In particular, it is important in this case to prioritize the order in which these processes are taken into account when adapting the resource distribution. In this case, the particular assigned processing time extensions of these processes are preferably adapted based on a runtime priority. The particular assigned processing time extension is particularly advantageously increased by a predefined value for low-priority processes. This makes it possible to achieve, in particular, that higher-priority, time-critical processes are treated as a priority during the resource distribution. Alternatively or additionally, the resource distribution is adapted iteratively or consecutively or one after the other for each of these processes, preferably as a function of a runtime priority, in particular, starting with a top-priority process. The resource distribution is thus advantageously first adapted for a top-priority process, and the remaining processes are subsequently iteratively processed accordingly.

The present invention is suitable for a multiplicity of different application areas. The present invention is particularly advantageously suitable for the (motor) vehicle sector, the processing unit being advantageously designed as a control unit of a (motor) vehicle, and the individual processes being carried out to control vehicle functions. Processes carried out by the processing unit may include, for example, safety-critical functions, which are carried out for safely operating and controlling the vehicle, for example during the course of an engine control or during the course of driver assistance functions, etc. Due to the method, it may be particularly advantageously made possible that such safety-critical and, in particular, time-critical processes to be carried out in real time meet their particular real-time conditions and are not delayed due to access conflicts to shared resources of the control unit, in particular to shared memories used. Safety or reliability and integrity of the control unit may be increased by the present method. In particular, the method may make it possible to meet safety requirements in the (motor) vehicle sector, as specified, for example, in the ISO 26262 standard or, in particular, by the so-called "Automotive Safety Integrity Level" (ASIL), a safety requirement level specified by ISO 26262 for safety-relevant systems in motor vehicles.

A processing unit according to the present invention, e.g., a control unit of a motor vehicle, is configured to carry out a method according to the present invention, in particular from a programming point of view.

It is also advantageous to implement a method according to the present invention in the form of a computer program or computer program product, including program code, to carry out all method steps, since this is particularly cost-effective, in particular when an executing control unit is used for other tasks and is thus present anyway. Suitable data media for providing the computer program are, in particular, magnetic, optical and electrical memories, such as hard disks, flash memories, EEPROMs, DVDs, among other things. Downloading a program via computer networks (Internet, intranet, etc.) is also possible.

Further advantages and embodiments of the present invention result from the description and the figures.

The present invention is schematically illustrated in the figures on the basis of exemplary embodiments and described below with reference to the figures.

DETAILED DESCRIPTION OF EXAMPLE EMBODIMENTS

Figure 1:
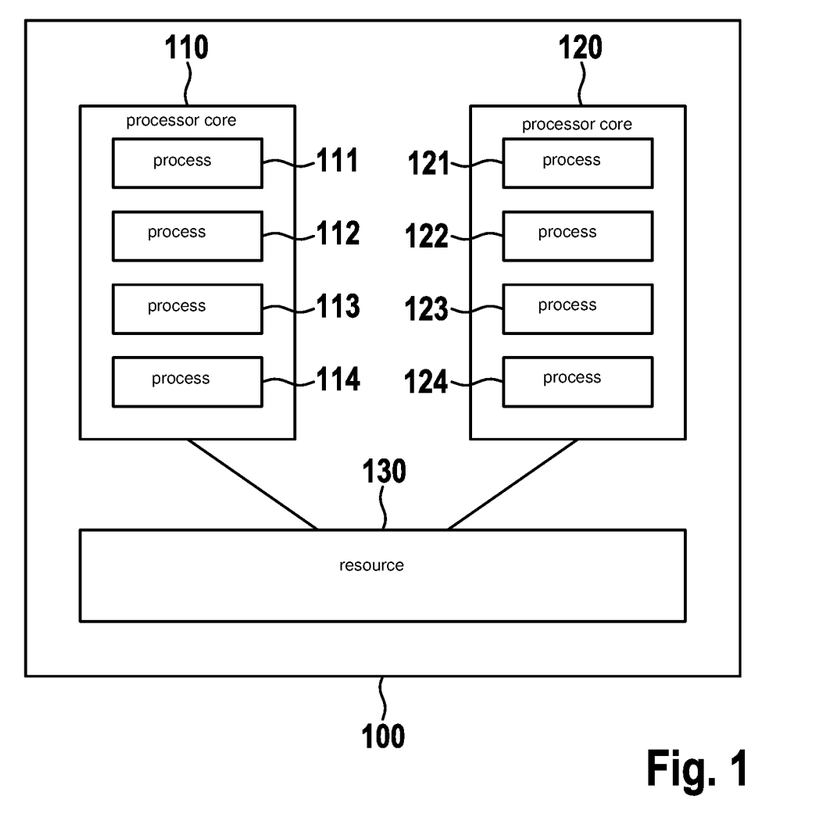
FIG. 1 schematically shows one preferred embodiment of a processing unit according to the present invention, which is configured to carry out a preferred specific embodiment of a method according to the present invention.

A processing unit, in this case, for example, of a vehicle, for example a control unit, is schematically illustrated and identified by 100 in FIG. 1.

Control unit 100 includes a processor unit having two processor cores 110 and 120. A multiplicity of processes 111, 112, 113, 114 and 121, 122, 123, 124 are carried out by each of these processor cores 110, 120. It is understood that the processor unit may also have a larger number of processor cores, and that a larger number of processes may also be carried out in each case on the individual processor cores.

Control unit 100 may be, for example, an engine control unit for controlling an electric machine of the vehicle. Individual processes 111, 112, 113, 114, 121, 122, 123, 124 may include safety-critical functions for safely operating the vehicle and for controlling the machine.

Processes 111, 112, 113, 114, 121, 122, 123, 124 may together access a resource 130 according to a predefined resource distribution, for example a shared memory unit used, e.g., a random access memory designed as a DRAM. For this purpose, processor cores 110, 120 are jointly connected to a memory 130 via a data connection, e.g., a data bus.

Due to the joint access to the memory, delays may occur during the execution of the individual processes. To counteract delays of this type, the resource distribution may be dynamically adapted during the operation of the control unit. For this purpose, the control unit is configured, in particular from a programming point of view, to carry out a preferred specific embodiment of a method according to the present invention, as illustrated schematically in FIG. 2 as a block diagram and as is explained below.

Figure 2:
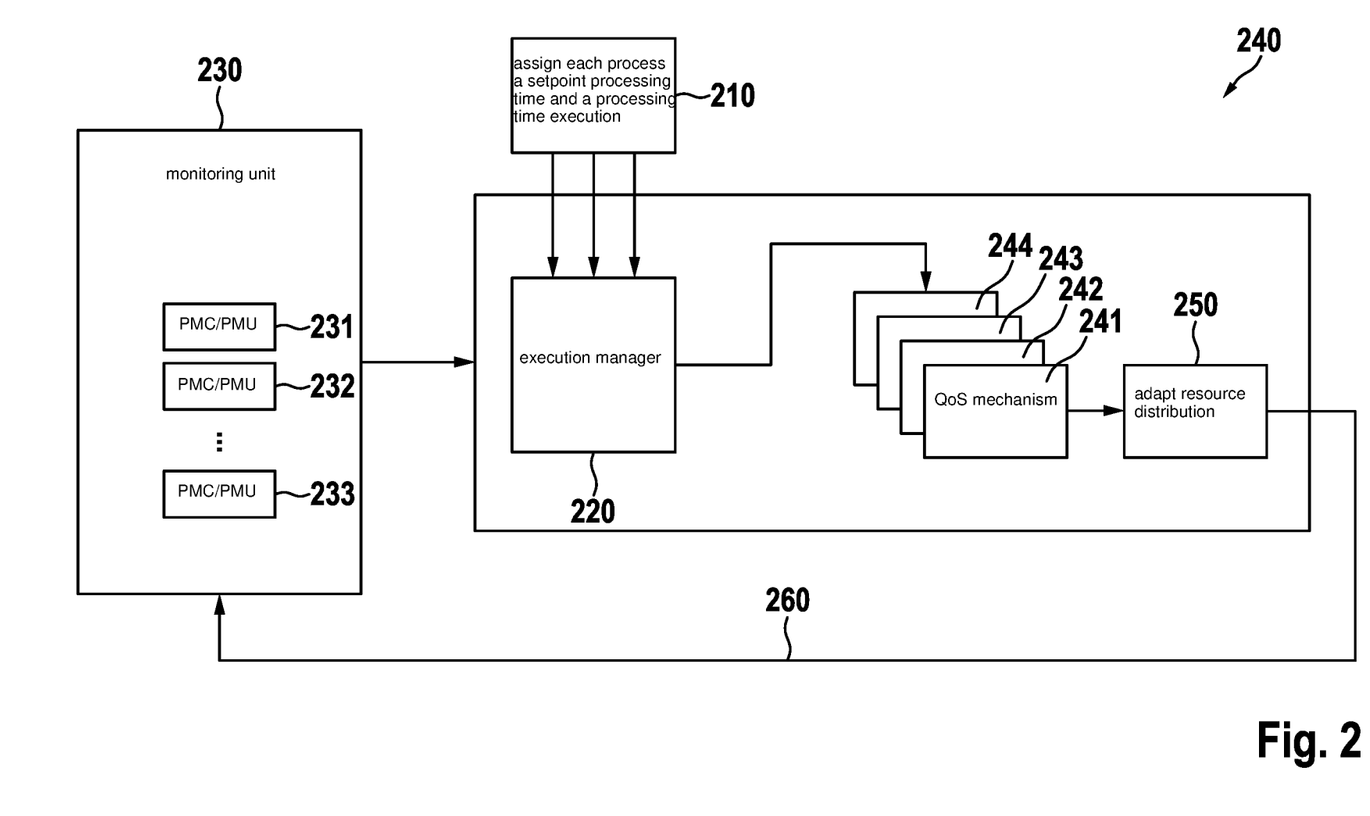
FIG. 2 schematically shows one preferred specific embodiment of a method according to the present invention as a block diagram.

In a (preparatory) step 210, processes 111, 112, 113, 114, 121, 122, 123, 124 are each assigned a setpoint processing time and a processing time extension. Individual processes 111, 112, 113, 114, 121, 122, 123, 124 are each to be processed with these setpoint processing times. An actual processing time of individual processes 111, 112, 113, 114, 121, 122, 123, 124 should deviate from the particular assigned setpoint processing time by no more than the particular assigned processing time extension.

In particular, these setpoint processing times and processing time extensions may be determined by a programmer or software developer, for example during the course of a manufacturing or programming phase of particular processes 111, 112, 113, 114, 121, 122, 123, 124. The setpoint processing time may correspond, for example, to the expected runtime, if the particular process is carried out in an isolated manner in a processing unit having exclusive access to a memory. A sum of the setpoint processing time and the processing time extension may be predefined as a permissible threshold or limiting value, by which the processing time may be maximally extended so that instabilities do not occur due to the joint accesses to the memory. Setpoint processing times and processing time extensions are further predefined, in particular, based on a criticality or priority, in particular, based on real-time requirements of the particular processes.

The setpoint processing times as well as the processing time extensions may each be indicated, for example, as absolute time values or also as relative values. For example, the setpoint processing times may each be predefined as counter values of a performance monitoring counter or (hardware) performance monitoring unit, and the processing time extensions may each be predefined as percentage deviations from these counter values. The corresponding runtimes or the specific time values for the setpoint processing times and for the processing time extensions may then be derived from these counter values by the target hardware platform.

The setpoint processing times and the processing time extensions are stored in control unit 100, in particular in an execution manager 220, which is designed as a software mechanism or software unit or software module in control unit 100 or may also be provided, for example, as a separate hardware module. During the execution of individual processes 111, 112, 113, 114, 121, 122, 123, 124 in control unit 100, execution manager 220 determines instantaneous actual processing times, within which individual processes 111, 112, 113, 114, 121, 122, 123, 124 are processed.

These instantaneous actual processing times are determined, for example, with the aid of at least one performance monitoring counter. Control unit 100 includes, in particular, a monitoring unit 230, which includes a multiplicity of performance monitoring counters (PMCs) or (hardware) performance monitoring units (PMUs) 231, 232, 233, e.g., in the form of special registers, which each measure or count certain operations or activities in control unit 100. Execution manager 220 reads in information from these performance monitoring counters 231, 232, 233 and determines the instantaneous actual processing times of individual processes 111, 112, 113, 114, 121, 122, 123, 124 based thereon.

For example, execution cycles of processes may be monitored with the aid of performance monitoring counter 231. For example, events 0xE7/0xE8 may be measured by performance monitoring counter 232 in an ARM processor architecture for the purpose of calculating memory downtimes due to write or read operations. In addition, level 2 cache misses and L2 cache write-backs, for example, may be monitored with the aid of performance monitoring counter 233 for the purpose of determining delays due to memory accesses.

Execution manager 220 compares the determined actual processing times of individual processes 111, 112, 113, 114, 121, 122, 123, 124 with the particular assigned setpoint processing times and also with the sum of the particular setpoint processing times and the particular processing time extensions. The resource distribution is adapted as a function of a result of this comparison. Deviations of the actual times from the assigned setpoint times indicate, in particular, conflicts in the memory accesses and processing delays resulting therefrom. The resource distribution is dynamically adapted as a function of these deviations.

During the course of the resource distribution, the accesses of individual processes 111, 112, 113, 114, 121, 122, 123, 124 to shared memory 130 are regulated, in particular, based on different distribution parameters. In particular, a multiplicity of distribution, control or organization mechanisms 240 are provided for this purpose, which assign portions of resource 130 to individual processes in different ways according to these distribution parameters. For this purpose, a multiplicity of QoS modules, QoS mechanisms or QoS controllers 241, 242, 243, 244 are particularly advantageously provided, which regulate a particular distribution mechanism based on a particular distribution parameter.

One or multiple of the distribution parameters are adapted as a function of the result of the comparison. In particular, for this purpose, execution manager 220 translates the setpoint processing times and processing time extensions into QoS-specific setpoint values or tuning parameters for different hardware and software QoS mechanisms 240. If individual actual processing times deviate from the particular setpoint processing times, execution manager 220 instructs particular QoS controller 240 to adapt the corresponding distribution parameter.

In a step 250, the resource distribution is adapted accordingly, and the processes access shared memory 130 according to this adapted resource distribution. The instantaneous actual processing times are then redetermined by performance monitoring counters 230, indicated by reference numeral 260, and compared with the setpoint times or the permissible extensions by execution manager 220. In particular, a control loop may thus be implemented, and the resource distribution may be advantageously dynamically regulated or controlled. During the course thereof, execution manager 220 may, in particular, determine the actual processing times cyclically at predefined monitoring intervals, compare them with the predefined values and adapt the resource distribution. Moreover, execution manager 220 may learn in this way relationships, connections or correlations between the adaptation of individual distribution parameters and the change of the actual processing times of individual processes resulting therefrom, e.g., during the course of machine learning. These learned relationships may be used in subsequent monitoring intervals for adapting the resource distribution. The adaptation of the resource distribution may thus be continuously improved.

Each QoS controller is responsible for a particular QoS mechanism and coordinates the QoS parameters accordingly. For example, QoS controller 241 may be provided for a regulation of the memory bandwidth. For example, if it is established by execution manager 220 that the actual processing time of time-critical process 111 deviates from the assigned setpoint processing time by more than the predefined processing time extension, execution manager 220 instructs QoS controller 241 to reduce the memory bandwidth assigned to other processes 112, 113, 114, 121, 122, 123, 124 for the duration of the next monitoring interval and to instead assign it to aforementioned time-critical process 111.

In addition, QoS controller 242 may be provided, for example, to control an interconnect. If execution manager 220 establishes, for example, that a process on a core, e.g., on core 110, exceeds the permissible processing time extension, execution manager 220 may instruct QoS controller 242, for example, to reduce the number of outstanding transactions of other cores 120 for the duration of the next monitoring interval, or to increase the priority of transactions on core 110 so that they are processed faster.

For example, QoS controller 243 may be responsible for a cache hierarchy. If execution manager 220 establishes, for example, that the processing time of time-critical process 111 exceeds the permissible processing time extension, execution manager 220 may instruct QoS controller 243 to partition the cache, e.g., with the aid of software mechanisms, such as cache coloring, or hardware mechanisms, such as those provided by ARM DynamiQ CPU architectures, so that parts of the cache are exclusively reserved for process 111, which reduces disturbing effects.

Since it may not be possible to meet the requirements of all applications in all situations at the same time (e.g., due to transiently increasing competition scenarios), execution manager 220 decides as needed which processes are prioritized. This may take place, for example, by specifying a predefined degradation sequence, e.g., based on the criticality and safety requirements, to ensure the performance of higher-priority processes. If execution manager 220 establishes that the actual processing times of multiple processes each deviate from the assigned setpoint processing time by more than the assigned processing time extension, execution manager 220 may advantageously increase the assigned processing time extensions of lower-priority processes and then carry out the control loop to meet these changed values. Alternatively or additionally, execution manager 220 may advantageously, as a function of a runtime priority of these processes, iteratively adapt the resource distribution for each of these processes during the course of a control loop, starting with a top-priority process.

Within the scope of the present method, different QoS parameters may thus be dynamically regulated in the software/hardware, which are controlled by the pieces of information received from one or multiple performance monitoring counters (PMCs) to meet the QoS requirements of the application established by a user. For example, pieces of information about L2 cache misses and write-backs or pieces of information about blocking cycles due to resource accesses may be used to dynamically configure budgets for shared resources used for different processes or processor cores with the aid of a corresponding software mechanism or other QoS mechanisms on the interconnect. Moreover, measurements of performance monitoring counters, such as DDR performance monitoring counters or performance monitoring counters on the interconnect, may be used, for example, to dynamically configure different software/hardware QoS mechanisms. OS kernel events may be additionally used, for example, to control the configuration of the QoS mechanisms. Due to the present method, an average system performance, in particular, may thus be increased, and performance guarantees for applications may be ensured.

With the aid of the present method, main memory interferences (e.g., measured with the aid of cache misses of the last monitoring cycle) and also cache interferences may particularly advantageously be controlled, for example using additional pieces of information of the performance monitoring counter.

According to the present method, the execution manager particularly advantageously regulates itself, in particular based on specified pieces of information, such as criticality, time periods and safety margins. A user specifies, in particular, only QoS requirements without knowing details of the hardware/software stacks. The mechanism is thus transparent for the user and makes the configuration and use less complex from the user's point of view.

What is claimed is:

1. A method of a processing system that includes (a) a plurality of hardware processors, in which a plurality of processes are executed and (b) a hardware resource shared by the plurality of processes executed by the plurality of hardware processors, the method dynamically adapting a distribution of accesses of the shared hardware resource to the plurality of processes, wherein the distribution is in accordance with a combination of a plurality of resource allocation parameters, the method comprising performing the following steps in each respective iteration of a plurality of adaptation iterations of an iterative procedure during runtime of the plurality of processes on the plurality of hardware processors:
   for each respective one of at least one of the plurality of processes:
      at a respective point in time, determining, by the processing system, an instantaneous actual processing time of the respective one of the at least one of the plurality of processes until the respective point in time; and
      comparing, by the processing system, the actual processing time of the respective one of the at least one of the processes determined in the respective iteration a with a sum of (a) a setpoint processing time assigned specifically to the respective one of the at least one of the plurality of processes and (b) a processing time extension assigned specifically to the respective one of the at least one of the plurality of processes to determine whether there is a variation state in which the compared actual processing time is longer than a tolerated processing time, wherein the setpoint processing times and the processing time extensions each differs between two or more of the plurality of processes; and
   until a final one of the iterations of the iterative procedure, performing, by the processing system, an adaptation by which to reduce an extent of the variation state in an immediately following one of the iterations;
   wherein:
      in each of at least a subset of the iterations, the adaptation includes modifying a respective one or more of the resource allocation parameters; and
      the resource allocation parameters include at least one of a memory bandwidth allocation parameter, a parameter of allocation of numbers of transactions to different ones of the hardware processors, and a cache partition control parameter.

2. The method as recited in claim 1, wherein the iterations are carried out at predefined monitoring intervals.

3. The method as recited in claim 1, wherein a respective type or extent of each of the adaptations is dependent upon a respective extent of the variation state of the respective iteration.

4. The method as recited in claim 1, wherein the determination of the instantaneous actual processing time is carried out using at least one performance monitoring counter.

5. The method as recited in claim 1, further comprising:
   based on changes to the variation state over time due to the adaptations, determining relationships between respective adaptations of different respective ones of the resource allocation parameters and a change of the variation state, wherein one or more of the adaptations are performed based on the determined relationships.

6. The method as recited in claim 1, wherein the resource distribution is adapted in that:
   a part of the resource assigned to a first process of the plurality of processes is partially or completely assigned to a second process of the plurality of processes; and/or
   a number of transactions to be carried out is reduced for a predefined time interval; and/or
   an execution priority of a certain process of the plurality of processes is increased or reduced; and/or
   the resource or at least a part of the resource is exclusively assigned to a certain process of the plurality of processes; and/or
   the resource is partitioned into partitions, and one of the partitions is exclusively assigned to a certain process of the plurality of processes.

7. The method as recited in claim 1, further comprising, when an actual processing time of each process of multiple of the plurality of processes deviates from a setpoint processing time assigned to the process by more than a processing time extension assigned to the process:
   adapting the assigned processing time extensions of the plurality of processes, based on a runtime priority of the plurality of processes, the assigned processing time extension being increased by a predefined value for low-priority processes; and/or
   adapting the resource distribution as a function of a runtime priority of the processes iteratively for each of the plurality of processes, starting with a top-priority process.

8. The method as recited in claim 1, wherein the processing system is part of, includes, or is a control unit of a vehicle, and the processes control vehicle functions of the vehicle.

9. The method as recited in claim 1, wherein different ones of, or different combinations of, the resource allocation parameters are modified in different ones of the iterations.

10. The method as recited in claim 9, wherein the resource allocation parameters include two or more of the memory bandwidth allocation parameter, the parameter of allocation of numbers of transactions to different ones of the hardware processors, and the cache partition control parameter.

11. The method as recited in claim 1, wherein one or more of the adaptations changes at runtime a proportion of use, by the plurality of hardware processors for different ones of the processes, of one or more physical assets of the processing system by which the hardware resource is accessed.

12. The method as recited in claim 1, wherein one or more of the adaptations changes at runtime a proportion of use, by the plurality of hardware processors for different ones of the processes, of access of the hardware resource.

13. The method as recited in claim 1, wherein in each of at least one of the iterations, the adaptation includes modifying the respective processing time extension assigned to at least one of the processes.

14. The method as recited in claim 13, wherein the modifying of the respective processing time extension is performed based on respective priorities of different ones of the plurality of processes.

15. A processing unit, comprising:
a control unit of a vehicle, wherein the vehicle includes (a) a plurality of hardware processors in which a plurality of processes are executed and (b) a hardware resource shared by the plurality of processes executed by the plurality of hardware processors, the method dynamically adapting a distribution of accesses of the shared hardware resource to the plurality of processes, wherein the distribution is in accordance with a combination of a plurality of resource allocation parameters, the control unit being configured to perform the following in each respective iteration of a plurality of adaptation iterations of an iterative procedure during runtime of the plurality of processes on the plurality of hardware processors:
for each respective one of at least one of the plurality of processes:
at a respective point in time, determine, by the processing system, an instantaneous actual processing time of the respective one of the at least one of the plurality of processes until the respective point in time; and
compare, by the processing system, the actual processing time of the respective one of the at least one of the processes determined in the respective iteration with a sum of (a) a setpoint processing time assigned specifically to the respective one of the at least one of the plurality of processes and (b) a processing time extension assigned specifically to the respective one of the at least one of the plurality of processes to determine whether there is a variation state in which the compared actual processing time is longer than a tolerated processing time, wherein the setpoint processing times and the processing time extensions each differs between two or more of the plurality of processes; and
until a final one of the iterations of the iterative procedure, perform, by the processing system, an adaptation by which to reduce an extent of the variation state in an immediately following one of the iterations;
wherein:
in each of at least a subset of the iterations, the adaptation includes modifying a respective one or more of the resource allocation parameters; and
the resource allocation parameters include at least one of a memory bandwidth allocation parameter, a parameter of allocation of numbers of transactions to different ones of the hardware processors, and a cache partition control parameter.

16. A non-transitory machine-readable storage medium on which is stored a computer program that is executable by a processing system, the processing system including (a) a plurality of hardware cores, in which a plurality of processes are executed and (b) a hardware resource shared by the plurality of processes executed by the plurality of hardware processors, the method dynamically adapting a distribution of accesses of the shared hardware resource to the plurality of processes, wherein the distribution is in accordance with a combination of a plurality of resource allocation parameters, the computer program, when executed by the processing system, causing the processing system to perform the following steps in each respective iteration of a plurality of adaptation iterations of an iterative procedure during runtime of the plurality of processes on the plurality of hardware processors:
for each respective one of at least one of the plurality of processes:
at a respective point in time, determining, by the processing system, an instantaneous actual processing time of the respective one of the at least one of the multiplicity plurality of processes until the respective point in time; and
comparing, by the processing system, the actual processing time of the respective one of the at least one of the processes determined in the respective iteration with a sum of (a) a setpoint processing time assigned specifically to the respective one of the at least one of the plurality of processes and (b) a processing time extension assigned specifically to the respective one of the at least one of the plurality of processes to determine whether there is a variation state in which the compared actual processing time is longer than a tolerated processing time, wherein the setpoint processing times and the processing time extensions each differs between two or more of the plurality of processes; and
until a final one of the iterations of the iterative procedure, performing, by the processing system, an adaptation by which to reduce an extent of the variation state in an immediately following one of the iterations;
wherein:
in each of at least a subset of the iterations, the adaptation includes modifying a respective one or more of the resource allocation parameters; and
the resource allocation parameters include at least one of a memory bandwidth allocation parameter, a parameter of allocation of numbers of transactions to different ones of the hardware processors, and a cache partition control parameter.

\* \* \* \* \*